Patented May 21, 1946

2,400,718

UNITED STATES PATENT OFFICE 2,400,718

PREPARATION OF CERTAIN REACTIVE PHENOL-ALDEHYDE RESINS AND THEIR USE AS MODIFYING AGENTS FOR ROSIN

Ernst Fritz Siegel, Elizabeth, N. J., assignor to Reichhold Chemicals, Inc., Detroit, Mich.

No Drawing. Application December 6, 1944,
Serial No. 566,948

8 Claims. (Cl. 260—19)

The present invention relates to certain reactive phenolaldehyde condensation products and to a process of preparing them. It also pertains to their use as modifying agents for rosin, rosin esters or ester gums.

The invention is particularly concerned with the preparation of thermosetting condensation products which may be best defined as Novolak polyalcohols. These are obtained through following the procedure of my invention, by first forming a Novolak from ordinary phenol and an aldehyde and reacting then the preformed Novolak with formaldehyde in the presence of a strong alkaline catalyst at low temperature. The resulting compound represents a Novolak in which the unoccupied reactive positions have been partly or completely substituted by methylol groups.

The other important feature of my invention is that these Novolak polyalcohols can be used very effectively to modify rosin. It is surprising to find that they form with rosin homogeneous reaction products although the high reactivity and the relatively large molecular size of a Novolak polyalcohol might lead to the assumption that it would rather be converted to an insoluble infusible resin instead of undergoing a smooth chemical reaction with rosin. A polyalcohol derived from a dicyclic phenol (dihydroxydiphenylpropane) represents the condensation product of largest molecular size ever described in patent, or other literature as being useful for the modification of rosin.

It has been known for many years that rosin and rosin esters may be very much improved by the incorporation of reactive phenol-formaldehyde condensation products which, by this treatment, are rendered soluble in drying oils unless soluble originally. These combined products have higher melting points, yield solutions of greater viscosity and are more resistant to alkali and weathering than ordinary ester gum.

All phenol-aldehyde condensation products hitherto prepared for this purpose, to the best of my knowledge, have been made from alkylated phenols, e. g., tertiary butylphenol, phenols reacted with ketones, e. g., dihydrodiphenylpropane and alkyl phenols obtained from coal tar or petroleum, e. g., cresols, xylenols, etc.

When straight unmodified phenol was used either resins of Novolak character were produced which for lack of proper reactivity did not undergo much more than a fusion process with rosin so that the final products were not much improved in their quality, or, as in United States Patent No. 1,623,901, Example 7, and British Patent No. 259,030, Example 8, presumably a reactive phenol resol (phenol alcohol) was used, the preparation of which was too vaguely described to be duplicated by anyone unfamiliar with the inventor's procedure, not to mention the huge excess of formaldehyde used in these examples (3 mols more per mol of phenol than theoretically can be combined at all). In United States Patent No. 1,623,901 and No. 1,736,757 the use of a reaction product from phenol, acetone and formaldehyde has been suggested for modification of rosin; in the former even all aldehydes and ketones are referred to as "carbonyl compounds for reacting on the phenolic bodies." However, those patents do not conflict with my invention for the following reasons:

1. The reaction of ketones with phenol to form an intermediate condensation product is much slower and less complete than that of aldehydes and therefore less economical.

2. The present invention is limited to the use of aldehydes as resin forming components, while nowhere in the literature has there been described up to now a practical process for producing straight phenol-aldehyde resin reactive with rosin.

Although straight phenol has been suggested to form a resin with anhydrous formaldehyde in the presence of rosin, such resins are at present out of the question for commercial use owing to the high price of paraformaldehyde. Although a number of patents dealing with this same subject mention phenol or phenol-aldehyde resins presumably as a generic name, none give any examples of the application of straight or unmodified phenol except the few cases mentioned above.

There remain to be mentioned a few more patents which cover certain phenol-aldehyde condensation products and/or the process of preparing them, although these products are not used or suggested for the modification of rosin.

In United States Patent No. 1,614,171 phenol polyalcohols are described which are made exclusively from mono- and dicyclic phenols. The distinct difference between this patent and my own invention can be best illustrated on Example #3 of said patent. The polyalcohol disclosed therein is prepared from diphenylolethane and formaldehyde. The former is a pure dicyclic phenol while the starting compound I use for the preparation of my polyalcohol is a Novolak. Both phenolic compounds may be obtained by the reaction of phenol with acetaldehyde of which the conditions are the decisive factor for the formation of the final product. Diphenylolethane is a chemical individual of the following constitution:

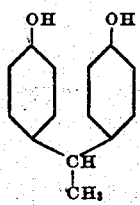

while my Novolak represents a mixture of probably di-, tri-, tetracyclic and possibly higher complex phenolic compounds of approximately the following structure:

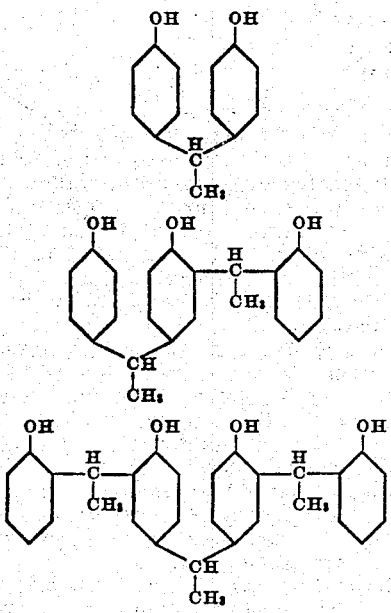

It is obvious that the polyalcohol described in Example #3 of the aforementioned patent differs from my Novolak polyalcohol in much the same way that the dicyclic phenol differs from my mixture of complex phenols as shown by the formulae above.

United States Patent No. 1,699,727 is solely concerned with the preparation of cast phenolic resins. The only similarity between this patent and my own invention is that both processes are carried out in two successive steps, the first of which is the formation of a Novolak in either case. However, the respective products obtained in the second step are completely different from each other. The "potentially reactive composition" covered by this patent consists of Novolak, phenol, formaldehyde and a basic catalyst, preferably ammonia, while the final product obtained by following my process constitutes essentially a neutral Novolak polyalcohol. Although it is obvious that the two products are clearly distinguished by their different chemical composition, it must also be emphasized that Weith's intermediate product does not and cannot yield a Novolak polyalcohol during its conversion process into "a firm jelly and finally a solid hard mass." Phenol alcohols are obtained only by means of strong alkalis as catalysts at low temperatures while weak bases favor the formation of diphenylolmethane derivatives. Therefore, when Novolak, phenol and formaldehyde are heated at 40° C. in the presence of ammonia or hexamethylentatramine, as described in the patent referred to, large molecules are formed by cross linkage of the original small molecular units through methylene bridges and a jelly or a hard resin is formed. In contrast to this, when Novolak is reacted with formaldehyde at 30°–40° C. in presence of e. g. NaOH methylol groups are attached to the reactive positions of the phenol nuclei and the resulting condensation product is a liquid Novolak polyalcohol. The average molecular weight of the Novolak polyalcohol is essentially the same as that of the Novolak it is derived from not taking into account the increase caused by the substitution of hydrogen atoms of the phenol nuclei by methylol groups. The formation of a Novolak polyalcohol is, of course, extremely important since its methylol groups are utmost essential for the later reaction with rosin. On the other hand, Weith's product is not a polyalcohol in any phase of its conversion from a liquid intermediate to a solid and is thus useless for the particular purpose my Novolak polyalcohol is designed for.

Also in United States Patent No. 1,582,056 a two step process covering a certain method as to manufacture cast phenolic resins is described. In the first step 20% of the total phenol is reacted with formaldehyde in acid medium forming a Novolak. In the second step the residual 80% phenol is added and the resulting mixture is further reacted with formaldehyde in alkaline medium. The inventor describes his second step reaction as follows:

"The whole is then boiled once more until the new formation of resin is finished."

The distinct differences between the product and process of this patent and my own invention are principally these:

I have the total amount of phenol present during the condensation in acid medium at the end of which about 20% phenol is uncombined. The free phenol may be removed by any suitable means or it may remain with the Novolak. In the latter case it is evident that my phenolic composition contains about 80% Novolak and about 20% phenol when the condensation with formaldehyde in alkaline medium is started. Kulas' phenolic mixture contains only about 20% Novolak and about 80% phenol at the same stage of the reaction. In other words the proportion of phenol to Novolak is just the reverse in the respective processes. It is obvious that Kulas' alkaline condensation product for the preparation of which phenol is essentially used as the starting material would be quite different from mine which is derived essentially from Novolak even if the reaction conditions in both cases were the same. However, the difference between the respective alkaline condensation product becomes even greater due to the fact that the alkaline reactions are carried out under quite dissimilar conditions. Those disclosed by Kulas are very vaguely described although he definitely states that he boils his reaction mixture. In contrast to this, I react my Novolak with formaldehyde at a temperature not higher than 40° C. until practically all formaldehyde is combined. Kulas' high temperature procedure yields an indefinite mixture in which the valuable methylol groups originally formed are converted to a great extent into methylene bridges causing the formation of large molecular resinous complexes, while in my process the Novolak and the small residual amount of phenol are converted into polyalcohols exclusively. That large molecules are actually formed in Kulas' second step reaction is proven by the fact that his final condensation product is, according to his own description, settling out of an aqueous alkali solution of about the same alkali content per mol of phenol as used in my process. My polyalcohol remains homogeneously dissolved throughout the alkaline condensation and precipitates only when neutralized. Summarizing, it can be inferred from the discussion above that Kulas' intermediate—

(1) Is neither a phenol—nor a Novolak polyalcohol.
(2) Is thus unsuitable for the reaction with rosin, and
(3) Lacks uniformity from batch to batch since the given procedure is very vague.

The only known method of making phenol-aldehyde-resin-modified ester gum of high quality is to utilize the valuable reactive methylol groups attached to the phenol nucleus by reacting the phenol with formaldehyde in strong alkaline medium at low temperature. This procedure has been known for years and applied as well in manufacturing processes for a long time, but using only modified phenol as a resin base. The reasons why straight phenol has never been employed to prepare reactive aldehyde resins for modification of rosin become apparent on consideration of the various difficulties its use entails. These difficulties may be summarized as follows:

1. Phenol condensed with aqueous formaldehyde in alkaline medium at low temperature yields phenol alcohols which are infinitely water soluble and cannot be separated from the water without vacuum distillation.

2. In case of vacuum distillation all alkali, which has to be applied in a rather large quantity in order to carry out the formaldehyde combination within a reasonable time at low temperature is left in the resin and has a detrimental effect on both the condensate and its combination product with rosin, or if neutralized, is precipitated as salt after the evaporation of water and produces turbidity in the modified rosin. Moreover, the salt cannot be washed out, due to the great water solubility of the condensation product, as mentioned above.

3. If only a small or negligible quantity of alkali is used which might be left in the final phenolic condensation product, higher temperature must be applied in order to combine the formaldehyde completely within a reasonable time. But an elevated temperature changes the course of reaction destroying a considerable portion of the reactive methanol groups which undergo further reaction with phenolic bodies forming unreactive methylene bridges. Moreover, under this type of treatment the reaction mechanism becomes uncontrollable, the degree of condensation and the reactivity of the final phenolic resin being different from batch to batch even if the same amount of formaldehyde is applied in each instance and combined to the same extent.

The essence of my invention resides in the discovery of a novel reactive condensation product of uniform quality derived from ordinary phenol and aldehyde exclusively and a method of preparing it which overcomes all the aforementioned process difficulties. The invention further resides in the application of my condensation product for the modification of rosin or ester gum which reaction has been hitherto carried out with condensation products derived from modified phenols. The invention gains particular importance from the considerations which are to follow. It makes possible:

1. The use of ordinary phenols which is relatively inexpensive in comparison with modified phenols, which in some cases are more than twice as high in price as phenol itself, the unmodified phenol being available as a raw material base in almost any desired quantity.

2. The use of phenol in combination with aldehydes exclusively, which undergo a much more ready and complete reaction than ketones, suggested by some inventors previously, to form an intermediate condensation product.

3. The production of oleoresinous varnishes which possess better qualities than those in which modified phenols are used as a resin base. Nowadays when slow drying oils like linseed oil and dehydrated castor oil are displacing more and more wood oil varnishes, my improved resinous product is of especially great interest because it brings the most essential properties (e. g. bodying time, drying speed, alkali and weather resistance) of linseed oil varnishes up to the level of those obtained from wood oil.

My method for preparing reactive phenol-aldehyde resins derived from straight phenol suitable for the modification of rosin preferably comprises the following steps:

1. Phenol is first reacted with a part only of the total amount of aldehyde used in the process, in acid medium in order to form a water insoluble Novolak. The ratio of phenol to aldehyde may vary in a wide range, although I prefer to use 1 mol phenol to about 0.5 mol aldehyde. Any aldehyde reacting with phenol may be applied in this stage of the process although I prefer to use formaldehyde and acetaldehyde. The latter may be used in its monomeric or polymeric form. As catalyst any strong organic or inorganic acid which is able to combine the aldehyde within a reasonable time may be employed. Some free phenol (about 20% of the total amount applied) which may be left uncombined in this stage may be distilled off by steam or under vacuum or may remain in the Novolak and be reacted with formaldehyde in the second step. The amount of uncombined phenol, if any, remaining at the end of this stage is in any event relatively small as compared with the quantity of phenol initially used, so that the principal phenol-aldehyde reaction takes place in the first stage, while the principal reaction taking place in the second stage is between the preformed Novolak formed in the first stage and formaldehyde, in the presence of an alkaline catalyst.

2. The preformed Novolak is further condensed at low temperatures (not exceeding 40° C.) with aqueous formaldehyde in strong alkaline medium to yield a Novolak polyalcohol the methylol groups of which are of utmost importance for the later reaction with rosin. The proportion of Novolak to formaldehyde may be varied within a wide range. The amount of formaldehyde used in the alkaline reaction must adjust the molecular ratio of total phenol groups to total aldehyde to at least 1:1, however I prefer to bring it within the range of 1:1.5–1:1.8. The amount of alkaline catalyst, preferably NaOH or KOH, is so regulated that it dissolves the Novolak and the aqueous formaldehyde homogeneously and brings about practically complete combination of the reactants at low temperatures within a reasonable time. The reaction time is a function of the temperature, the quantity of alkali catalyst per phenol unit and the molecular ratio of phenolic groups to formaldehyde. It amounts to 2–5 days in the examples given below.

The reaction is considered complete when a quantitative determination shows that only about 5% of the formaldehyde applied for the alkaline condensation is uncombined. At this point the mixture is neutralized; thereby the condensation product is settling out and can be separated from the water. The resin is washed with fresh water and is then ready for the reaction with rosin. The resulting product is liquid and can easily be handled in the following operations leading to the manufacture of phenol modified ester gum.

In this way I obtain a straight phenol-aldehyde resin which:

(1) Represents a highly reactive Novolak polyalcohol of uniform quality.
(2) Is water insoluble to a large extent and can therefore easily be separated from water and freed from alkali.
(3) Yields a clear reaction product with rosin suitable for the production of high quality oleoresinous varnishes.

It is advantageous to esterify such a modified rosin with polyhydric alcohols to obtain a substantially neutral final product.

The phenol-aldehyde resins herein described may also be used for molding purposes, for adhesives, straight phenolic varnishes, etc., but my principal object herein relates to its application as a modifying agent for rosin or ester gum. On the other hand it should be noted that the process and products set forth herein are completely different from the well known process for making molding resins, wherein a Novolak is first prepared in which hexamethylenetetramine is incorporated as a hardening agent, aside from the fact that those resins would not be useful for the combination with rosin.

The following specific examples are given by way of illustration and not by way of limitation.

*Example 1*

(a) A mixture of 470 gms. phenol, 243 gms. aqueous formaldehyde (37% by weight) and 2–3 cc. concentrated HCl is heated up to 100° C. and held for 1–2 hours until all formaldehyde has been combined. Then 70 gms. NaOH (50% by weight) are added and the mixture is cooled down to 30° C. Hereupon 485 gms. formaldehyde (37% by weight) are gradually added at about 30° C. and the mixture is then held at this temperature until not more than 5% formaldehyde remains uncombined, which procedure takes about 4–5 days. Then neutralization with HCl takes place, the separated water is drained off and the resin washed with fresh water to remove the salt.

(b)

Gum rosin (M. P. about 65° C.) _____grams__ 720
Phenolic resin as prepared under (a) containing about 17% water_____grams__ 107
Glycerol _____do____ 54

The above constituents, when treated according to the well known procedure to make phenolic-resin modified ester gum yield a product of the following specifications:

Acid No _____ 24
Melt point _____ 121°
Viscosity (55% in toluene) _____
_____ Q–R (Gardner-Holdt tubes)

*Example 2*

(a) 940 gms. phenol, 220 gms. para-aldehyde and 5 cc. concentrated HCl are heated up to 100° C. and held for about 2–3 hours until practically all aldehyde has been combined. Then the water split off during the reaction and the phenol which remained uncombined are distilled off under vacuum. The resin obtained is a Novolak. 560 gms. of this Novolak are dissolved in 235 gms. NaOH (specific gravity 1.2) and gradually mixed with 405 gms. formaldehyde (37% by weight) at about 30° C. This mixture is held for 2–3 days at about 30° C. until not more than 5% formaldehyde is uncombined. Then the resin is precipitated by neutralization with HCl, the water drained off and the resin freed from salt by washing with fresh water.

(b)

Gum rosin (M. P. about 65° C.) _____grams__ 720
Phenolic resin as described under (a) containing about 24% water_____grams__ 150
Glycerol _____do____ 54

Above constituents when treated in the usual manner yield a product of the following constants:

Acid number _____ 30
Melt point _____ 123°
Viscosity (55% in toluene) _____
_____ F–G (Gardner-Holdt tubes)

*Example 3*

(a) 470 gms. phenol and 110 gms. para-aldehyde with 3 cc. concentrated HCl as a catalyst are reacted together by heating up to 100° C. and holding for 2–3 hours until all the aldehyde has been combined. Then 70 gms. of NaOH (50%) are added, the mass is cooled down to about 30° C. and subsequently mixed with 520 gms. formaldehyde (37% by weight). After about 3–4 days during which time the temperature maintained at about 30° C. all but about 5% formaldehyde has been combined, the resin is separated and washed as indicated in Examples 1 and 2.

(b)

Gum rosin (melt point about
  65° C.) _____grams__ 720
Phenolic resin as described under (a)
  containing about 22% water_____ do ___ 147
Glycerol _____ do ___ 50

Above constituents give a product of the following specifications:

Acid number _____ 26
Melt point _____ 141°
Viscosity (55% in toluene) _____ Q–R (c) Sample varnish cook:

Oil_____linseed oil, 25 gallon oil length
Procedure_____held for 1 hour 50 minutes at 580° F., then diluted with mineral spirits to 50% non-volatile and drier added
Viscosity_____E–F (Gardner-Holdt tubes)
Dustfree_____after 1 hour
Tackfree_____after 6 hours
Alkali resistance (2% aqueous NaOH
  solution) _____ 2 hours The present application is a continuation-in-part of my application Serial No. 417,856, filed November 4, 1941.

While, in the foregoing specific examples, alkaline catalysts such as NaOH and KOH are given by way of illustration, other alkaline catalysts may be employed without departing from the spirit of the invention, as, for example, the alkaline earth hydroxides such as Ca(OH)$_2$ and Ba(OH)$_2$.

I claim:

1. A process of producing reactive phenol-aldehyde resins which comprises reacting exclusively unmodified phenol and an aldehyde in two successive steps: (1) forming a Novolak in acid medium using the total amount of phenol but only part of the total amount of aldehyde, and (2) condensing further the intermediate Novolak with aqueous formaldehyde in a medium of strong alkali without addition of further phenol at a temperature not above 40° C. to convert it into a Novolak polyalcohol.

2. A process as defined in claim 1 in which the mol ratio of total combined aldehyde to phenol is at least 1:1 so that finally a heat hardening resin is formed.

3. A reactive phenol-aldehyde resinous condensation product formed by reacting exclusively unmodified phenol and an aldehyde in two successive steps which consist in first reacting the total amount of phenol with only part of the total amount of aldehyde in an acid medium to form a water insoluble Novolak, and then condensing further the intermediate water insoluble Novolak with aqueous formaldehyde in a medium of strong alkali without addition of further phenol at a temperature not above 40° C. to convert it into a Novolak polyalcohol.

4. A heat-hardening reactive resinous product according to claim 3 wherein the mol ratio of total combined aldehyde to phenol is at least 1:1.

5. A modified rosin formed by reacting the resinous product defined in claim 3 with rosin.

6. An oleoresinous varnish formed from a drying oil, and an ester gum produced by reacting the resinous product defined in claim 3 with rosin and a polyhydric alcohol.

7. An ester gum formed by reacting the resinous product defined in claim 3 with rosin and a polyhydric alcohol.

8. A reactive phenol-aldehyde resinous condensation product formed by reacting exclusively unmodified phenol and an aldehyde in two successive steps which consist in first reacting the total amount of phenol with only part of the total amount of aldehyde in an acid medium to form a water insoluble Novolak, and then condensing further the intermediate water insoluble Novolak with aqueous formaldehyde in a medium of strong alkali in the absence of uncombined phenol at a temperature not above 40° C. to convert it into a Novolak polyalcohol.

ERNST FRITZ SIEGEL.